(12) United States Patent
Stephens (10) Patent No.: US 7,385,961 B2
(45) Date of Patent: Jun. 10, 2008

(54) CONTENDING FOR THE MEDIUM WITH A MIXTURE OF BACKWARDS-COMPATIBLE WIRELESS DEVICES

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 11/167,964

(22) Filed: Jun. 27, 2005

(65) Prior Publication Data

US 2006/0291498 A1   Dec. 28, 2006

(51) Int. Cl.
*H04Q 7/24* (2006.01)
*H04L 12/66* (2006.01)
*H04B 1/00* (2006.01)
*H04M 1/00* (2006.01)

(52) U.S. Cl. ............... 370/338; 370/354; 370/437; 370/465; 455/553.1; 455/127.4

(58) Field of Classification Search ........... 370/219, 370/310.2, 328, 338, 344, 347, 352, 353, 370/355, 442, 461, 465; 455/127.4, 426.2, 455/552.1, 553.1, 561

See application file for complete search history.

(56) References Cited

U.S. PATENT DOCUMENTS

2005/0124294 A1   6/2005   Wentink

FOREIGN PATENT DOCUMENTS

GB   2391137   1/2004

OTHER PUBLICATIONS

U.S. Appl. No. 10/832,715, filed Apr. 26, 2004, Stephens.
PCT/US2006/025225 International Search Report mailed Nov. 7, 2006.

*Primary Examiner*—Afsar Qureshi
(74) *Attorney, Agent, or Firm*—John F. Travis (57) ABSTRACT

In a wireless network in which a central network device (e.g., an access point) communicates with multiple generations of mobile wireless devices that are backward compatible but not forward compatible, each generation of device may be selectively put into a mode that permits contending for the medium or a mode that does not permit contenting for the medium, through the use of packets that are formatted to be recognizable by some generations but not all generations.

23 Claims, 7 Drawing Sheets

CONTENDING FOR THE MEDIUM WITH A MIXTURE OF BACKWARDS-COMPATIBLE WIRELESS DEVICES

BACKGROUND

Under various wireless communications standards, a transmission from a mobile wireless device to an access point (AP) may be performed in two distinct modes: 1) While operating in a polled mode, a mobile wireless device may transmit to the AP only when it is specifically polled by the AP to do so. This technique may be used to keep two or more mobile wireless devices from trying to transmit to the AP at the same time and thereby causing a "collision" of their signals that might make both of their transmissions unintelligible. However, the overhead burden on the AP of separately polling every device may reduce the potential throughput of the network. 2) While operating in a medium contention (MC) mode, a mobile wireless device may transmit to the AP without being polled. While avoiding the AP's overhead burden of separately polling each device, this technique may result in collisions and subsequent retransmissions, which can also reduce network throughput. However, the mobile wireless devices that are contending for the medium in this manner may use other techniques to reduce the likelihood of collisions. One such technique for doing so is called Carrier Sense Multiple Access/Collision Avoidance (CSMA/CA), in which each mobile wireless device may transmit only after determining that the channel is not already being used. Since two or more devices may detect an unused channel at the same time and then try to transmit at the same time, this technique may still result in collisions, followed by retransmissions until all the packets are successfully transmitted.

One method of managing the medium contention mode is by having the AP or other node issue packets that reserve the medium (i.e., the packets direct the mobile wireless devices to refrain from initiating a communications sequence for a period of time, thereby reserving the channel for those devices that are specifically requested to use it). This process may become more complicated when a network has some mobile wireless devices that follow newer, higher-throughput standards, and also has some less capable mobile wireless devices that follow older standards. If the less capable devices have difficulty recognizing the communications with the more capable devices, the less capable devices may not recognize a directive to refrain from using the channel. Modifying the mobile wireless devices to manage this problem for themselves may place an unacceptable performance burden on those devices, especially on the older, slower, and/or less capable mobile wireless devices.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

The term "wireless" may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless device" may be used to describe a wireless device that may be moved while it is communicating.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or a combination of hardware, firmware, and software. The invention may also be implemented as instructions contained on a machine-readable medium, which may be read and executed by a computing platform to perform the operations described herein. A machine-readable medium may include any mechanism for storing, information in a form readable by a machine (e.g., a computer). For example, a machine-readable medium may include data storage media, such as but not limited to read only memory (ROM); random access memory (RAM); magnetic disk storage media; optical storage media; flash memory devices; etc.

Various embodiments of the invention may take advantage of the fact that some devices may recognize communications in a particular format that control medium reservation, while other devices do not recognize the communications in that format and therefore do not recognize the reservation directive. This situation may be created, for example, when multiple generations of mobile wireless devices are operating in the same network, and the newer generations are backward compatible with communications designed for the older generations, but the older generations are not forward compatible with communications designed for the newer generations. As used herein, the term "format" may indicate any type of encoding, modulation, synchronizing, protocol, etc., used to generate the packet. As used herein, the term "recognize" indicates that the receiving device is able to interpret the content of a packet sufficiently to understand that one purpose of the packet is to control reservation of the wireless medium, and if applicable is also able to determine the intended time period of that reservation. Using this principle, a first class of devices may be directed to reserve the medium (i.e., avoid initiating a communications sequence with another device) or to stop reserving the medium (i.e., be free to initiate a communications sequence with another device), while a second class of devices may not recognize the directive and will therefore continue in whatever mode it was already in. This principle may be extended to as many classes of devices as are feasible. Within the context of this document, 'contending for the medium' may mean contending for the right to control one or more channels over a wireless transmission medium during a communications sequence with at least one other wireless device. Responding to a request from another device within a communications sequence is not considered 'controlling' the channel(s).

FIGS. 1-5 show timing diagrams of communications sequences, according to various embodiments of the invention. The upper rows of these figures show when each of the indicated classes of devices may contend for the medium and when they should refrain from contending for the medium (although they may still respond to a communication addressed to them as part of a communications sequence that was initiated by another wireless device). The blocked areas labeled NAV (for network allocation vector) indicate when that class of device will consider the medium reserved and will therefore not try to initiate a communications sequence. The non-blocked areas labeled MC (for medium contention) indicate when that class of device will be free to contend for the medium. Such contention may use any feasible technique designed for medium contention, such as but not limited to CSMA/CA. Although the term NAV (network allocation vector) is used herein as an example for consistency and ease of understanding, the various embodiments should not be limited to any definition of the term outside this document unless the term is used in a claim. For convenience and ease of understanding, the three classes of mobile wireless devices are labeled 'HT40', 'HT20', and 'Legacy' to indicate high-throughput (HT) devices that can operate over a 40 MHz band, HT devices that can only operate over a 20 MHz band, and legacy devices using a technology developed earlier than the HT20 technology. However, the principles described herein may be applicable to other types of devices, and the three types that are described should not be seen as a limitation on the types of devices that may be within the scope of various embodiments of the invention.

The lower row indicates when an AP transmits one or more packets instructing the mobile wireless devices to enter or exit a NAV mode. An 'HT40' in the illustrated packet label indicates that HT40 devices are capable of recognizing the packet, but HT20 and Legacy devices are not. An 'HT20' in the illustrated packet label indicates that HT20 devices are capable of recognizing the packet, as are HT40 devices (which are backwards-compatible with HT20 ), but Legacy devices are not. A 'Legacy' in the illustrated packet label indicates that the Legacy devices are capable of recognizing the packet, as are both HT40 and HT20 devices (which are backwards-compatible with Legacy).

Various types of received packets may be recognized as directing the receiving device to consider the wireless network medium reserved (i.e., the receiving device may not contend with other devices to acquire control of the medium to initiate a communications sequence, although it may respond to a request from another device during that period). The receiving device may consider the medium reserved for an amount of time specified in the packet, or until directed to exit this mode by a subsequent packet. In some embodiments, observing this period of reservation may be referred to as setting a NAV. One example may be the use of a Clear-to-Send (CTS) packet, which under some communications protocols may cause receiving devices to set their NAV, regardless of which device the CTS packet may be addressed to. For clarity and ease of understanding, packets that have this effect may be generically labeled herein as NAV-Set, although other terms may be used elsewhere. Within the context of this document, a 'receiving device' or a 'recipient' is a device that recognizes the content of the packet sufficiently to act on that content, even if the packet was not addressed to that device.

Various other types of received packets may be recognized as directing the receiving device to stop considering the medium reserved, so that the receiving device may then enter an MC mode in which it may contend for the medium. In some embodiments this may be referred to as resetting a NAV. For clarity and ease of understanding, packets that have this effect are labeled in the drawings as 'NAV-End', although other terms may be used outside this document to describe such packets.

Each of FIGS. 1-5 shows one cycle of operation, plus a small part of the start of the next cycle. A cycle may be considered to be a period of communications during which each class of device has at least one MC period for its use. The illustrated examples show each type of device having one MC period during each cycle, but other embodiments may use other techniques. For example, one type of device may have one MC period during a cycle, while another type of device might have two or more MC periods during that cycle. Such operational differences may be based on various criteria, such as but not limited to: 1) a higher volume of data traffic by a particular type of device, 2) faster response time requirements by a particular type of device, 3) different quality of service requirements for each type of device, 4) etc.

Figure 1:
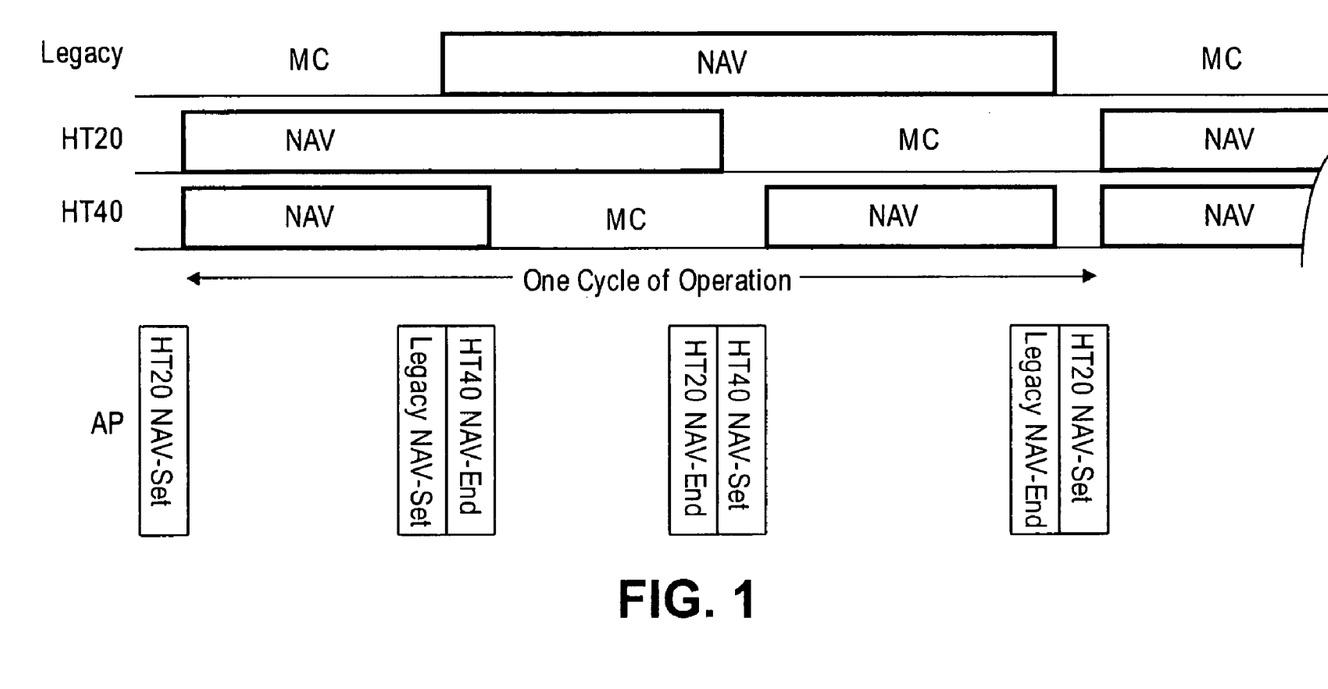
FIGS. 1-5 show timing diagrams of communications sequences, according to various embodiments of the invention.

FIG. 1 shows a communications cycle with three segments: an initial segment in which only Legacy devices may contend for the medium, a subsequent segment in which only HT40 devices may contend for the medium, and a final segment in which only HT20 devices may contend for the medium. At the beginning of the illustrated cycle, the AP may transmit a NAV-Set packet in an HT20 format. Since HT20 and HT40 devices are both able to recognize this format, the HT20 and HT40 devices may then enter a NAV mode (e.g., by setting their NAV) and refrain from contending for the medium. However, Legacy devices may not recognize the NAV-Set packet and may therefore remain in their current MC mode, in which they may contend for the medium.

At a later time, the AP may transmit a NAV-Set packet in a Legacy format. The Legacy devices recognize this format, and may therefore enter a NAV mode (e.g., by setting their NAV) and refrain from contending for the medium. The HT20 and HT40 devices may also recognize this command, but since they are already in the NAV mode their mode may remain unchanged. Once the Legacy NAV-Set packet is transmitted, the AP may transmit a NAV-End packet in an HT40 format. Since only the HT40 devices recognize this format, only the HT40 devices will exit the NAV mode and enter an MC mode. The HT20 and Legacy devices will not recognize the NAV-End packet in the HT40 format, and will therefore remain in their current NAV mode.

At a later time, the AP may transmit a NAV-End packet in an HT20 format. The HT20 devices recognize this format, and therefore enter an MC mode (e.g., by resetting their NAV). The HT40 devices may also recognize this command, but since they are already in the MC mode their mode may remain unchanged. Once the HT20 NAV-End packet is transmitted, the AP may then transmit a NAV-Set packet in an HT40 format. Since only the HT40 devices recognize this format, only the HT40 devices will enter the NAV mode. The HT20 devices will not recognize the NAV-Set packet in the HT40 format, and will therefore remain in their current MC mode. Similarly, the Legacy devices may not recognize the NAV-Set packet in the HT40 format, and will remain in their current NAV mode.

At a later time, the AP may transmit a NAV-End packet in a Legacy format. Since all three types of devices recognize a packet in this format, all three types of devices will enter, or remain in, an MC mode. A NAV-Set packet in the HT20 format may then start a new cycle. During the cycle just completed, each of the three types of devices had an MC period for their own use, with the other types of devices in a NAV mode so that they would not contend for the medium during that time period.

In the examples described, including those shown in FIGS. 1-5, some embodiments may sometimes use a NAV-Set packet containing timing information that indicates how long the NAV period should last. For some NAV periods no NAV-End packet may be sent (not shown), but rather the receiving device(s) may use this timing information to determine when to exit the NAV mode. Alternatively, for some NAV periods this timing information may be in the NAV-Set packet, but the NAV period may be terminated with a NAV-End packet before that time period expires. The various methods of terminating a NAV period may be mixed together in any feasible manner.

Figure 2:
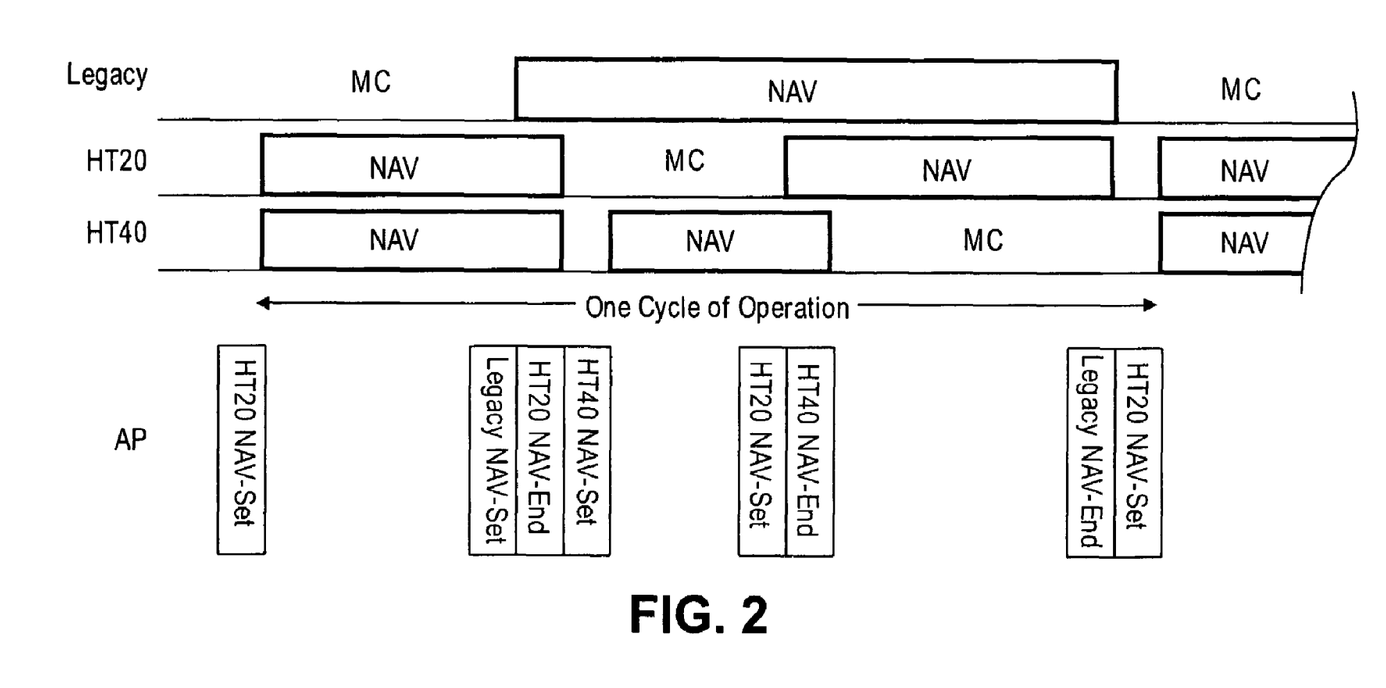

FIG. 2 shows a communications cycle similar to that of FIG. 1, but with a different order for the Legacy MC, HT20 MC, and HT40 MC periods. The sequence shown in FIG. 2 may require more NAV-Set and/or NAV-End packets from the AP, as compared to the sequence shown in FIG. 1. In the illustrated sequence of FIG. 2, after the initial HT20 NAV-Set and Legacy NAV-Set packets (similar to FIG. 1), an HT20 NAV-End packet may be used to cause both HT20 devices and HT40 devices to enter an MC mode, while the Legacy devices do not recognize the HT20 NAV-End packet and therefore remain in a NAV mode. An HT40 NAV-Set packet may then cause the HT40 devices to re-enter a NAV mode, so that only the HT20 devices are in an MC mode. At a later time, an HT20 NAV-Set packet may cause the HT20 devices to enter a NAV mode. The HT40 devices may recognize this command, but are already in a NAV mode, so they remain unchanged. The Legacy devices may not recognize the HT20 format, so they remain in their current NAV mode. The HT20 NAV-Set packet may be followed by an HT40 NAV-End packet to place the HT40 devices in an MC mode, while it has no effect on the other types of devices. This allows the HT40 devices to contend for the medium. At a later time, a Legacy NAV-End packet may place all three types of devices into an MC mode. The following HT20 NAV-Set packet may then start the cycle over.

Figure 3:
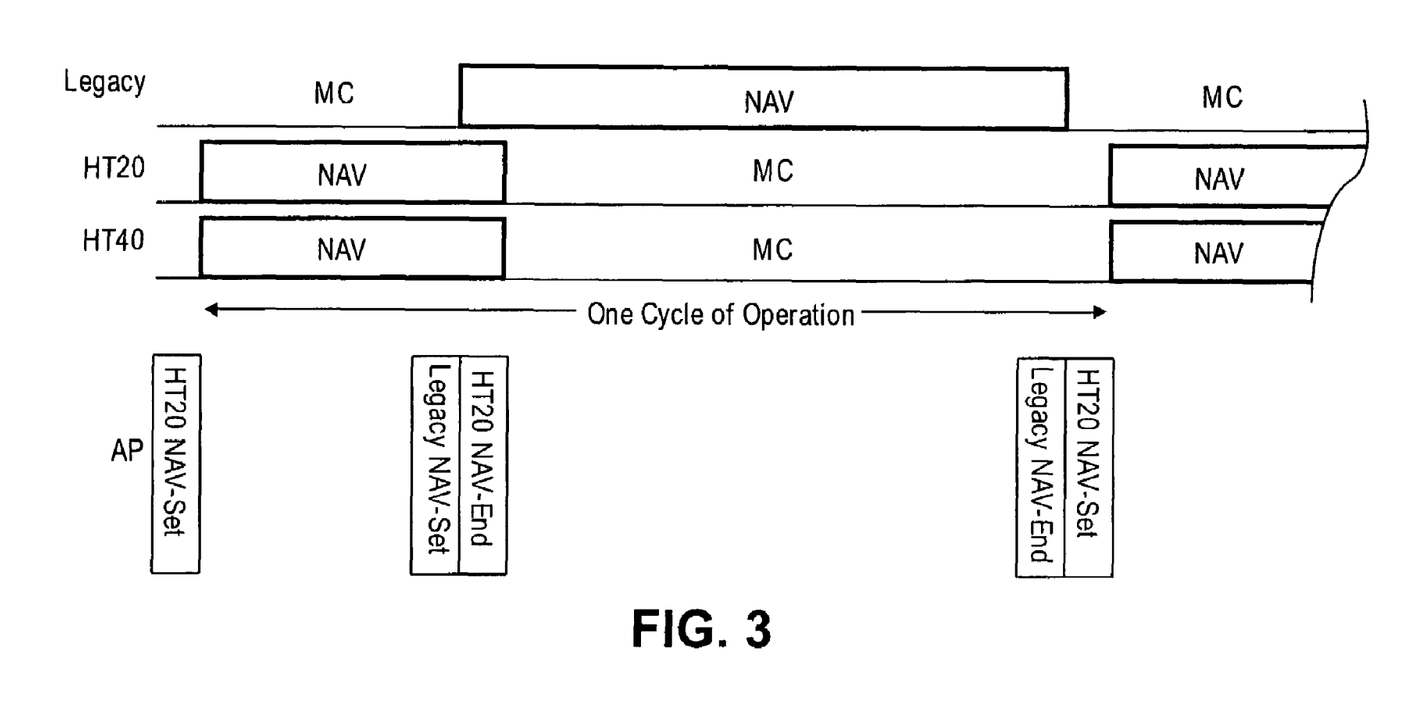

FIG. 3 shows a communications cycle with two segments in a cycle: one segment places the Legacy devices in an MC mode, while the other segment places the HT20 and HT40 devices in an MC mode at the same time. In the illustrated example, a cycle may begin when an HT20 NAV-Set packet causes HT20 and HT40 devices to enter a NAV mode, permitting only the Legacy devices to contend for the medium. At a later time, a Legacy NAV-Set packet may cause the Legacy devices to also enter a NAV mode. The HT20 NAV-End packet that follows may cause the HT20 and HT40 devices to enter an MC mode together, where they may both be permitted to contend for the medium. At a later time, a Legacy NAV-End packet may cause the Legacy devices to also enter an MC mode. The HT20 NAV-Set packet that follows may then cause the HT20 and HT40 devices to enter a NAV mode, starting the cycle over.

Figure 4:
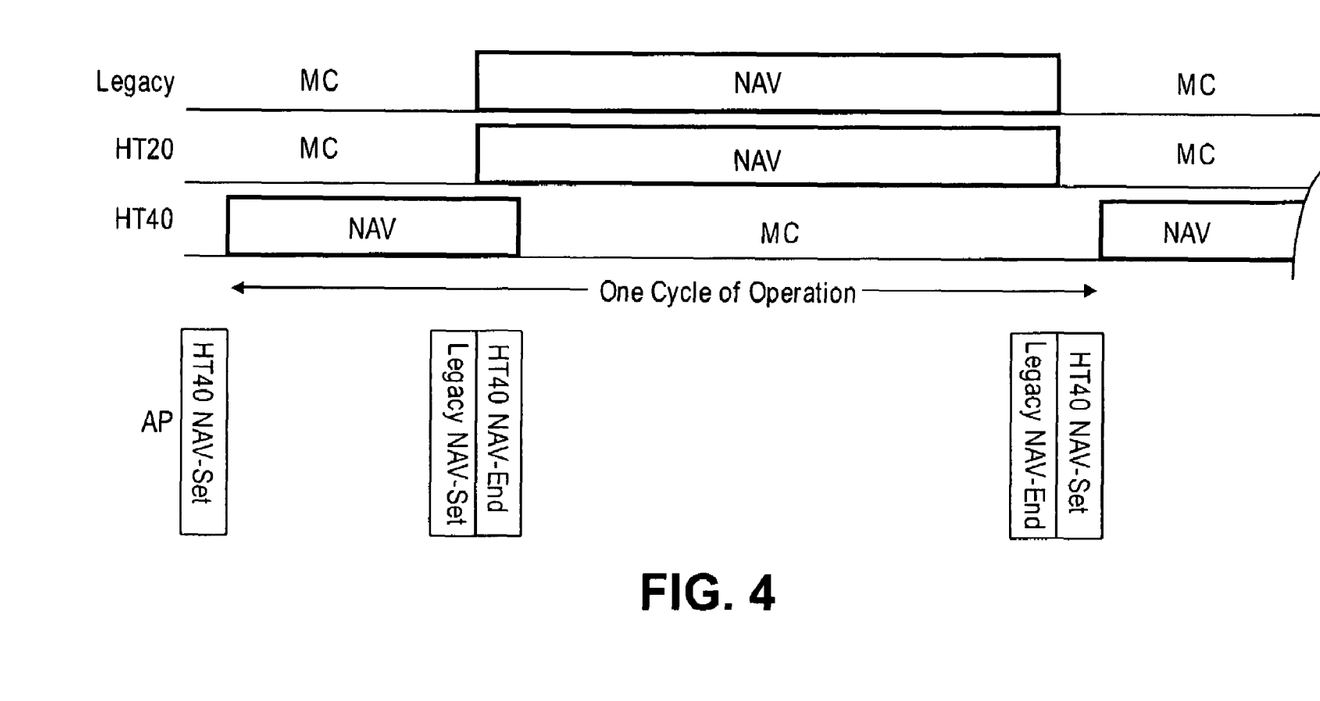

FIG. 4 shows a communication cycle similar to that of FIG. 3, but in this example the Legacy and HT20 devices share an MC period, while the HT40 devices have a separate MC period. In the illustrated example, an HT40 NAV-Set packet may initially cause the HT40 devices to enter a NAV mode, while the other devices do not recognize the packet and stay in an MC command. At a later time, a Legacy NAV-Set packet may cause all devices to enter, or remain in, a NAV mode. An HT40 NAV-End packet that follows may then cause the HT40 devices to enter an MC mode. At a later time, a Legacy NAV-End packet may cause all devices to enter an MC mode. The HT40 NAV-Set packet that follows may then start the cycle over again.

Figure 5:
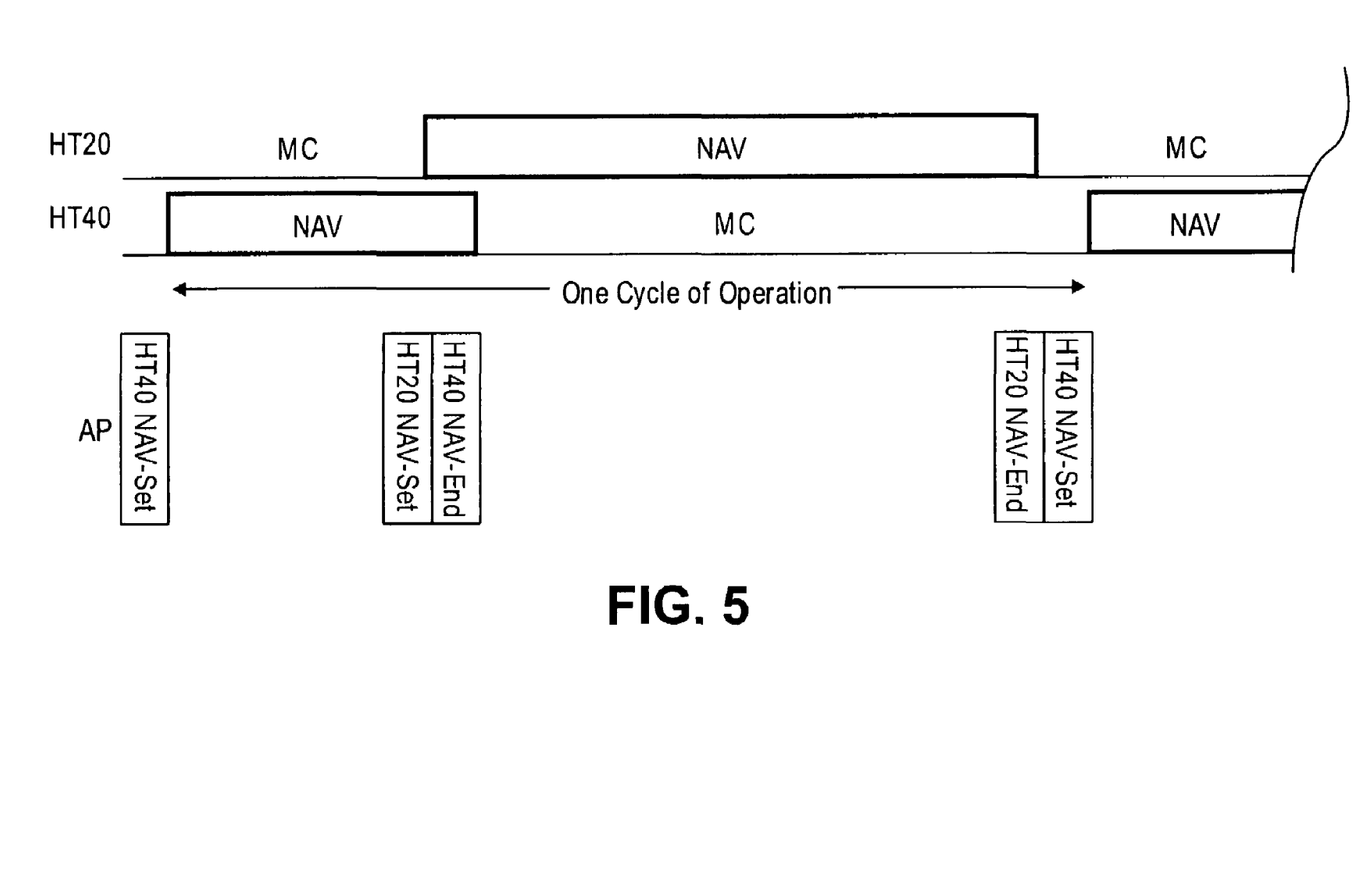

FIG. 5 shows a communication cycle that involves HT20 and HT40 devices, but no Legacy devices. In the illustrated example, an HT40 NAV-Set packet may cause the HT40 devices to enter a NAV mode, while the HT20 devices may not recognize the packet that therefore remain in an MC mode. At a later time, an HT20 NAV-Set packet may cause the HT20 devices to also enter a NAV mode, while the HT40 NAV-End packet that follows may cause the HT40 devices to then enter an MC mode. At a later time, an HT20 NAV-End packet may cause both types of devices to enter, or remain in, an MC mode. The HT40 NAV-Set packet that follows may then start the cycle over again.

As may be seen from these examples, NAV-Set packets and NAV-End packets that are formatted for recognition by specific types of devices may be used to cause certain types of devices to be placed in an MC mode while other types of device are in a NAV mode, or vice versa. Selective use of these packets may allow each type of device to have an MC period dedicated to that type of device, or may allow multiple types of devices to share an MC period. Although the examples describe specific types of devices (e.g., Legacy, HT20, HT40) and specific types of packets (e.g., NAV-Set and NAV-End), various embodiments of the invention may use the same principles with other types of devices and other types of packets. Some common factors in these embodiments may be: 1) the purpose of each type of packet is recognizable, and may therefore be acted upon, by some types of devices and but not recognizable by other types of devices, 2) the recognition is in a hierarchical structure (i.e., more capable types of devices may recognize the packets formatted for the less capable types of devices, but less capable types of devices may not recognize the packets formatted for more capable types of devices), and 3) at least one type of packet causes devices that recognize it to refrain from contending for the medium, while at least one other type of packet causes devices that recognize it to be permitted to contend for the medium.

Figure 6:
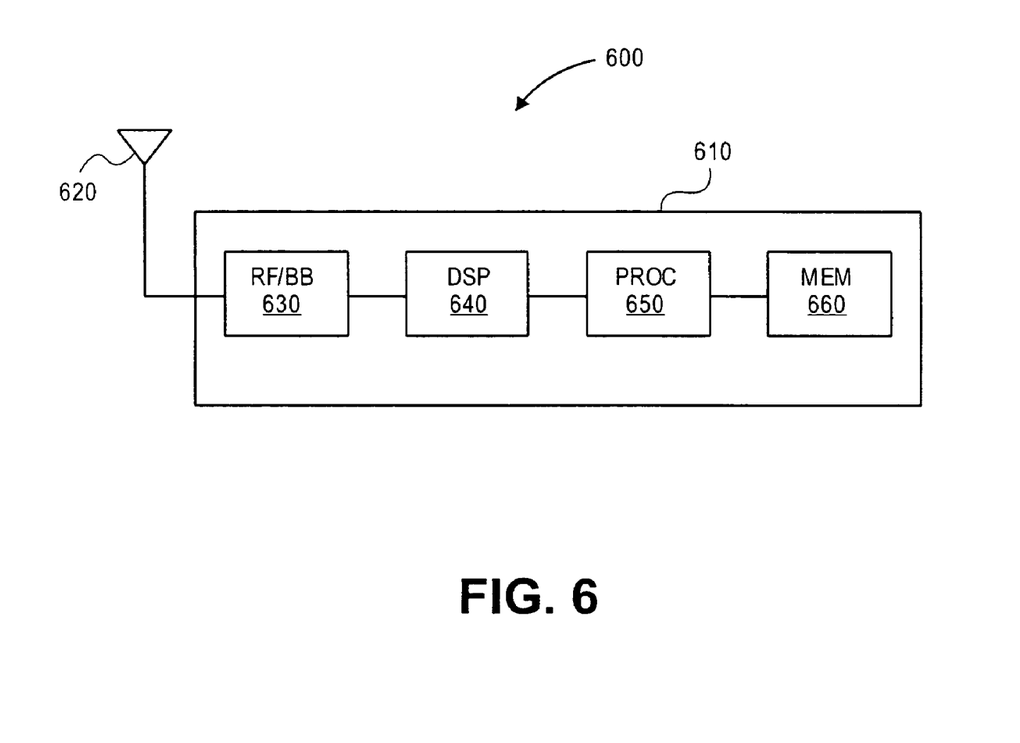
FIG. 6 shows a block diagram of a wireless device, according to an embodiment of the invention.

FIG. 6 shows a block diagram of a wireless device, according to an embodiment of the invention. The illustrated example may represent various types of wireless devices, such as but not limited to an AP and/or a mobile wireless device. The illustrated wireless device 600 may comprise one or more antennas 620, and a platform 610 comprising radio frequency/baseband (RF/BB) circuitry 630, digital signal processing (DSP) circuitry 640, a processor 650, and a memory 660. The RF/BB circuitry 630 may or may not also comprise other elements, such as but not limited to intermediate frequency (IF) circuitry, a power amplifier, etc. DSP circuitry 640 may or may not be implemented in the form of a digital signal processor, with its own memory (not shown). Processor 650 may execute instructions from memory 660, which may include one or more of any feasible types of memory, such as dynamic random access memory (DRAM), static random access memory (SRAM), flash memory, etc. Some embodiments of wireless device 600 may also comprise a battery (not shown)

Figure 7:
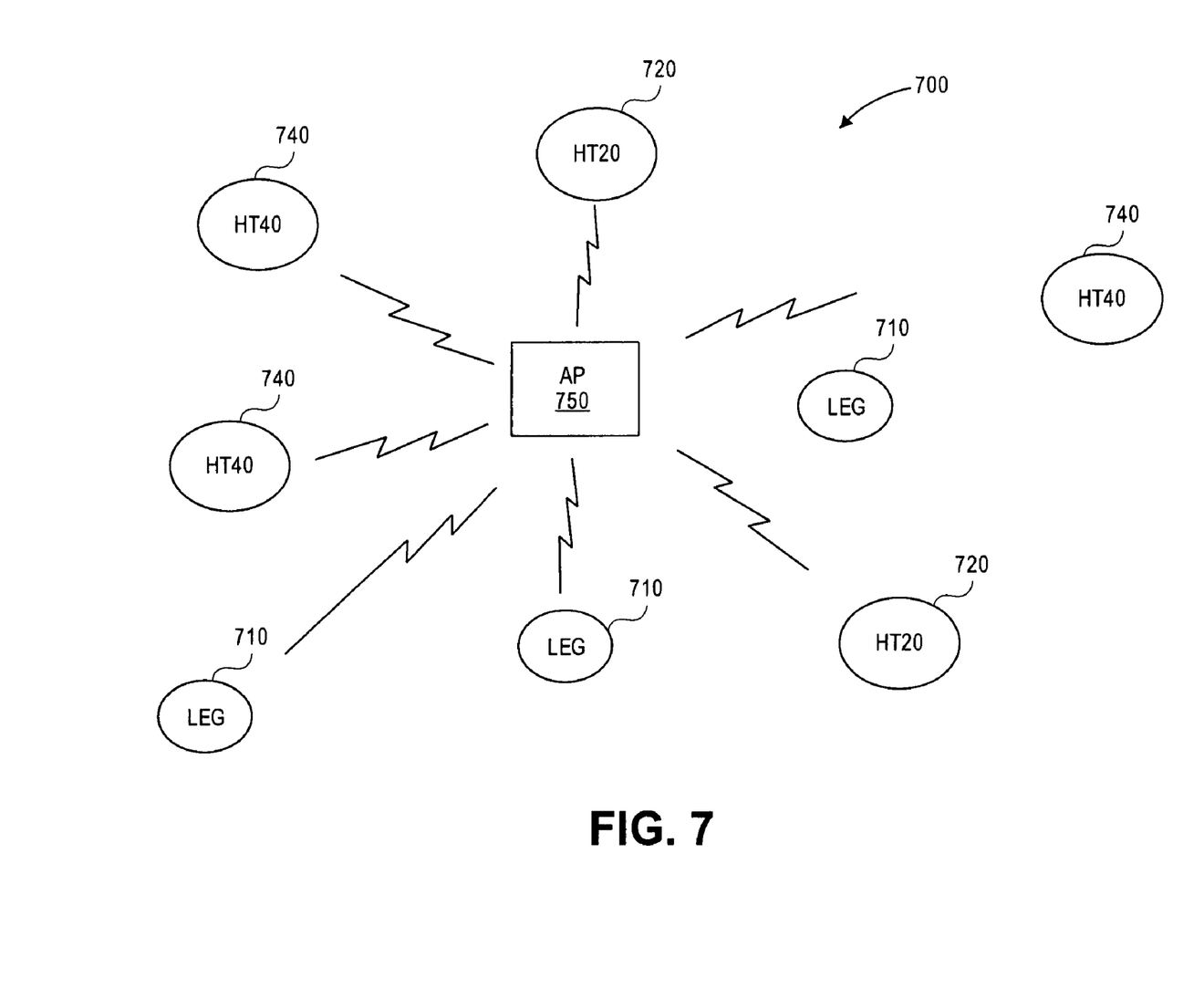
FIG. 7 shows a diagram of a wireless network, according to an embodiment of the invention.

FIG. 7 shows a wireless network, according to an embodiment of the invention. In the illustrated embodiment, wireless network 700 may comprise an AP 750, and recipient devices (i.e., devices that may receive transmissions from AP 750) in the form of one or more Legacy mobile wireless devices 710, one or more HT20 mobile wireless devices 720, and one or more HT40 mobile wireless devices 740. Each of the mobile wireless devices may communicate wirelessly with AP 750, under conditions determined by the particular communications protocol established for the network. In some embodiments, various mobile wireless devices may communicate directly with other mobile wireless devices in the network.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
   a first wireless device to transmit and receive wireless communications, the first wireless device to:
   transmit first and second packets, each packet to direct recipients of the packet to operate in a first mode in which contending for a transmission medium by the recipient is not permitted; and
   transmit a third packet to cause each recipient of the third packet to operate in a second mode in which contending for the transmission medium by the recipient of the third packet is permitted;
   wherein the first and third packets are formatted to be recognizable by a first type of mobile wireless devices but not recognizable by a second type of mobile wireless devices, and the second packet is formatted to be recognizable by both the first and second types of mobile wireless devices; and
   wherein the wireless device is further to transmit the first, second, and third packets in a sequence that causes the first type of mobile wireless devices to operate in the second mode and the second type of mobile wireless devices to operate in the first mode simultaneously during a first time period, and causes the first type of mobile wireless devices to operate in the first mode and the second type of mobile wireless devices to operate in the second mode simultaneously during a second time period.

2. The apparatus of claim 1, wherein the first wireless device is further to transmit a fourth packet to direct recipients of the fourth packet to operate in the second mode.

3. The apparatus of claim 1, wherein the second packet is to include timing information to indicate how long recipients of the second packet are to remain in the first mode.

4. The apparatus of claim 1, wherein the first wireless device comprises an access point.

5. The apparatus of claim 1, wherein the first wireless device further comprises a dynamic random access memory.

6. The apparatus of claim 1, wherein the first wireless device further comprises at least one antenna.

7. The apparatus of claim 1, wherein the first and third packets are formatted for reception by devices designed to operate over a 40 megahertz band.

8. The apparatus of claim 1, wherein the second packet is formatted for reception by devices designed to operate over a 20 megahertz band.

9. The apparatus of claim 1, wherein at least one of the first and second packets comprises a clear-to-send packet.

10. A method, comprising:
    transmitting first and second packets over a wireless medium from a wireless device, each of the first and second packets directing recipients of that packet to operate in a first mode in which contending for the wireless medium is not permitted; and
    transmitting a third packet over the wireless medium from the wireless device, the third packet directing recipients of the third packet to operate in a second mode in which contending for the wireless medium is permitted;
    wherein the first and third packets are recognizable by a first type of mobile wireless devices but not recognizable by a second type of mobile wireless devices, and the second packet is recognizable by both the first and second types of mobile wireless devices; and
    wherein the first, second, and third packets are transmitted in a sequence to cause the first type of mobile wireless devices to operate in the second mode and the second type of mobile wireless devices to operate in the first mode simultaneously during a first time period, and to cause the first type of mobile wireless devices to operate in the first mode and the second type of mobile wireless devices to operate in the second mode simultaneously during a second time period.

11. The method of claim 10, further comprising transmitting a fourth packet to direct recipients of the fourth packet to operate in the second mode.

12. The method of claim 10, wherein said transmitting the second packet comprises transmitting timing information in the second packet to indicate how long the recipients of the second packet are to remain in the first mode.

13. The method of claim 10, wherein said operating in the first mode comprises setting a network allocation vector.

14. The method of claim 10, wherein said operating in the second mode comprises resetting a network allocation vector.

15. The method of claim 10, wherein the first and third packets are formatted for reception by devices designed to operate a 40 megahertz band.

16. The method of claim 10, wherein the second packet is formatted for reception by devices designed to operate over a 20 megahertz band.

17. The method of claim 10, wherein at least one of the first and second packets comprises a clear-to-send packet.

18. An article comprising
a machine-readable medium that provides instructions, which when executed by a computing platform, result in at least one machine performing operations comprising:
transmitting first and second packets from a wireless device, each of the first and second packets to cause recipients of that packet to operate in a first mode in which contending for a transmission medium by the recipient is not permitted; and
transmitting a third packet from the wireless device to cause each recipient of the third packet to operate in a second mode in which said contending for the transmission medium by the recipient is permitted;
wherein the first and third packets are recognizable by a first type of mobile wireless devices but not recognizable by a second type of mobile wireless devices, and the second packet is recognizable by both the first and second types of mobile wireless devices; and
wherein said first, second, and third packets are transmitted in a sequence to cause the first type of mobile wireless devices to operate in the second mode and the second type of mobile wireless devices to operate in the first mode simultaneously during a first time period, and to cause the first type of mobile wireless devices to operate in the first mode and the second type of mobile wireless devices to operate in the second mode simultaneously during a second time period.

19. The article of claim 18, wherein the operations further comprise transmitting a fourth packet to cause recipients of the fourth packet to operate in the second mode.

20. The article of claim 18, wherein the operations further comprise transmitting timing information in the second packet to indicate how long the recipients of the second packet are to remain in the first mode.

21. The article of claim 18, wherein the operations further comprise formatting the first and third packets for reception by devices designed to operate over a 40 megahertz band.

22. The article of claim 18, wherein the operations further comprise formatting the second packet for reception by devices designed to operate over a 20 megahertz band.

23. The article of claim 18, wherein at least one of the first and second packets comprises a clear-to-send packet.

* * * * *